UNITED STATES PATENT OFFICE.

THOMAS WILKINSON BLAKEY, OF KEENE, NEW HAMPSHIRE, ASSIGNOR OF ONE-HALF TO JOHN A. WRIGHT, OF SAME PLACE.

COMPOSITION OF MATTER FOR ARTIFICIAL STONE.

SPECIFICATION forming part of Letters Patent No. 450,987, dated April 21, 1891.

Application filed March 29, 1890. Serial No. 345,872. (No specimens.)

*To all whom it may concern:*

Be it known that I, THOMAS WILKINSON BLAKEY, of Keene, in the county of Cheshire and State of New Hampshire, have invented certain new and useful Improvements in Composition of Matter for Artificial Stone; and I do hereby declare the following to be a full, clear, and exact description of the invention, such as will enable others skilled in the art to which it appertains to make and use the same.

My invention relates to an improvement in the manufacture of artificial stone, and more particularly to the composition of matter composing such stone and the successive steps of the process by which the component parts are united into a homogeneous mass, molded into shape, and hardened into articles of a practically impervious, fire-proof, and indestructible nature.

The composition consists of the following ingredients, combined in substantially the proportions named, to wit: granite, pulverized or granulated, forty parts; flint, pulverized, fifteen parts; feldspar, pulverized, five parts; fire-clay, four parts, and a sufficient quantity of water to moisten the mass.

The steps of the process followed in the manufacture of the material are as follows, viz: The granite is first calcined or subjected to a sufficiently intense heat to render the disintegration of the particles of the granite easy. After being thus treated the granite is pulverized or granulated and then sifted into different grades, according to the degree of fineness. This done, the other ingredients, previously prepared for the purpose, are thoroughly mixed and tempered in about the proportions mentioned with the granulated granite and water, and when soft and pliable the mixture is pressed or molded into any of the conceivable shapes that such materials are usually made to assume; but it is especially calculated to be molded into building-blocks, bricks, tile, terra-cotta, statuary, pottery, friezes, wainscoting, or any other useful and ornamental articles. After the material is pressed or molded into the desired form it is set aside to dry. When sufficiently dry the molded articles are placed in saggers and burned in a kiln the same as fine pottery, they being subjected to a temperature of about 4,000° Fahrenheit. The result is a substance resembling natural granite and superior to granite in many respects, in that it is stronger, its sustaining power is greater, it is fire-proof, and practically impervious to water. The articles may be made in various colors or tints to resemble different-colored marbles or stones. They may be glazed or ground off and polished, being susceptible of as fine a polish as natural granite, and the different-sized granules may be used in making different articles.

Having fully described my composition of matter, what I claim as new, and desire to secure by Letters Patent, is—

A composition of matter to be used in the manufacture of artificial stone articles, consisting in disintegrated granite, flint, and clay or equivalent binding material, the whole mixed with a sufficient quantity of water or other liquid to moisten the mass and produce a homogeneous substance, substantially as set forth.

In testimony whereof I have signed this specification in the presence of two subscribing witnesses.

THOMAS WILKINSON BLAKEY.

Witnesses:
   W. L. MASON,
   J. R. NEAL.